United States Patent
Sakakibara

[15] 3,653,688
[45] Apr. 4, 1972

[54] PIPE COUPLING DEVICE

[72] Inventor: Akira Sakakibara, 861 Horiuchi, Hayamamachi, Miura-gun, Kanagawa-ken, Japan

[22] Filed: Apr. 22, 1970

[21] Appl. No.: 30,708

[30] Foreign Application Priority Data

Feb. 28, 1970 Japan....................................45/20181

[52] U.S. Cl. .........................................................285/105
[51] Int. Cl. .......................................................F16l 17/00
[58] Field of Search ..........................285/105, 343, 348, 175

[56] References Cited

UNITED STATES PATENTS

| | | | |
|---|---|---|---|
| 792,377 | 6/1905 | Young | 285/343 |
| 3,466,069 | 9/1969 | Hoke et al. | 285/348 |
| 2,226,304 | 12/1940 | Dillon | 285/105 |
| 731,635 | 6/1903 | Vandegrift et al. | 285/175 |
| 644,167 | 2/1900 | Frink et al. | 285/343 |
| 18,116 | 9/1857 | Wright | 285/343 |
| 834,618 | 10/1906 | Herrick | 285/343 |
| 2,561,887 | 7/1951 | Risley | 285/348 |

FOREIGN PATENTS OR APPLICATIONS

1,272,652   7/1968   Germany...............................285/343

Primary Examiner—Andrew V. Kundrat
Attorney—Irving M. Weiner

[57] ABSTRACT

A device for coupling or decoupling pipe sections including two hollow cylindrical members each having a tapered inner surface portion and adapted to receive a pipe section. Several metallic balls are disposed between the tapered inner surface portion and a portion of the outer surface of the pipe section for acting as wedge means to prevent separation of the cylindrical member and the pipe section. Sealing means are located between the cylindrical member and its associated pipe section for providing an air-tight seal between the two. Fastening means are disposed between the hollow cylindrical members for moving the hollow members toward each other and for urging the sealing means against the inner surface of the hollow cylindrical members and the outer surface of the pipe sections to be joined.

4 Claims, 8 Drawing Figures

INVENTOR
AKIRA SAKAKIBARA

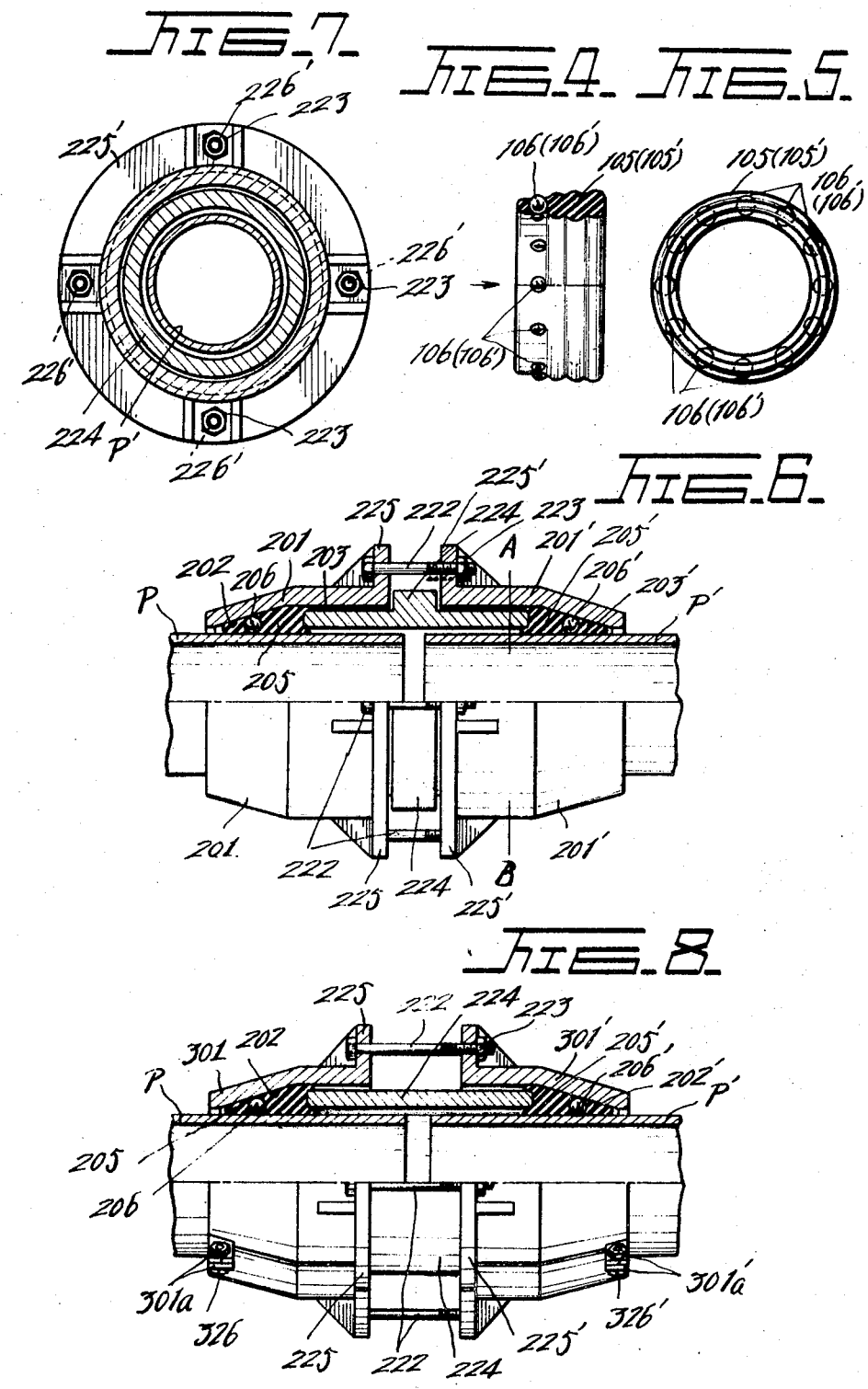

PIPE COUPLING DEVICE

The present invention relates to a device for selectively coupling and/or decoupling a plurality of pipe sections. More particularly, the invention relates to a pipe coupling device which effectively and advantageously utilizes specific properties of spherical bodies.

Heretofore, there have been proposed various types of pipe coupling devices, and many of the conventional coupling devices are adapted to be employed for joining pipe sections which have been previously subjected to mechanical processing, such as welding, threading, and the like. The conventional pipe coupling devices are not capable of accommodating the expansion, shrinkage, and strain of the pipe sections to be joined. Consequently, the conventional pipe coupling devices have to be employed in conjunction with separate devices which are capable of accommodating the expansion, shrinkage and strain of the pipe sections, In addition, the conventional pipe coupling devices have to be constructed and installed with very close tolerances which results in very expensive coupling devices.

SUMMARY OF THE INVENTION

The present invention provides a device for selectively coupling and/or decoupling a plurality of pipe sections, and includes a plurality of hollow members each having a tapered inner surface portion and adapted to receive at least one of the pipe sections. A plurality of spherical bodies are disposed between the tapered inner surface portion of a hollow member and a portion of the outer surface of an associated pipe section for acting as wedge means to prevent separation of the hollow member from its associated pipe section. Sealing means are disposed between a hollow member and its associated pipe section for selectively providing an air-tight seal therebetween when said sealing means is compressed. The device also includes a fastening means disposed between the hollow members for moving the hollow members toward each other and for urging the sealing means against the inner surface of the hollow members and the outer surface of the pipe sections.

The invention also provides a pipe coupling device which is characterized by a pair of hollow cylindrical members each having a tapered surface portion in its inner surface for receiving pipe section endwise therein. The device also includes wedge-acting balls disposed in spaces between the inner surface of the cylindrical members and the outer surface of the pipe sections. Air-tight resilient sealing means, such as rubber packings and the like, are disposed between the inner surface of the cylindrical members and the other surface of the pipe sections, whereby when the pipe sections move axially and/or transversely the balls may maintain their abutment relation with respect to the cylindrical members and the pipe sections to prevent the pipe sections from coming off the cylindrical members. At the same time air-tight seals are provided between the cylindrical members and the pipe sections by the sealing means which are adapted to be compressed between the cylindrical members and the pipe sections.

The present invention utilizes the specific properties of spherical bodies wherein the spherical bodies act as wedge means when the spherical bodies move relative to the tapered inner surface portions of the hollow cylindrical members. This allows the pipe sections to move axially while preventing the pipe sections from separating from the cylindrical members and maintaining air-tight seals between the inner surface of the cylindrical members and the outer surface of the pipe sections.

The present invention also provides a device for selectively coupling and/or decoupling a plurality of pipe sections, wherein the device is capable of accommodating the expansion, shrinkage and strain of individual pipe sections which are to be joined together by the device without the necessity of using any conventional expansion joints.

The invention also provides a device which makes it easy to move pipe sections into and out of the hollow members without the necessity of any skilled mechanic, plumber or other operator.

In addition, the present invention provides a pipe coupling device of the above type which can effectively perform its function to join pipe sections while at the same time eliminating the disadvantages inherent in the conventional pipe coupling devices.

In a preferred embodiment of the present invention, there is provided a pipe coupling device which includes cylindrical members disposed in axial alignment in a spaced relation and each having a tapered inner surface portion and for receiving a pipe section therein. Spherical bodies are received between the tapered inner surface portions of the cylindrical members and the pipe sections in abutment against the tapered inner surface portions and the pipe sections for acting as wedge means to prevent the separation of the cylindrical members from the pipe sections. Resilient air-tight sealing means are disposed between the cylindrical members and the pipe sections under compression for providing air-tight seals between the cylindrical members and the pipe sections. The device also includes fastening means disposed between the cylindrical members for pulling the cylindrical members toward each other so as to urge the sealing means against the inner surface of the cylindrical members and the outer surface of the pipe sections.

BRIEF DESCRIPTION OF THE DRAWINGS

FIG. 4 shows a fragmentary view of one of the packing members shown in FIG. 3.

FIG. 5 illustrates an end elevational view of the packing member shown in FIG. 4 as seen in the direction of the arrow indicated in FIG. 4.

FIG. 6 illustrates a side elevational view, partly in section, of a third or further embodiment of the coupling device according to the present invention.

FIG. 7 is a cross sectional view taken along the line A–B of FIG. 6 and as seen in the arrow direction therein.

FIG. 8 illustrates a side elevational view, in partial section, of a fourth or further embodiment of the coupling device according to the present invention.

DETAILED DESCRIPTION OF SOME EMBODIMENTS

Figure 1:
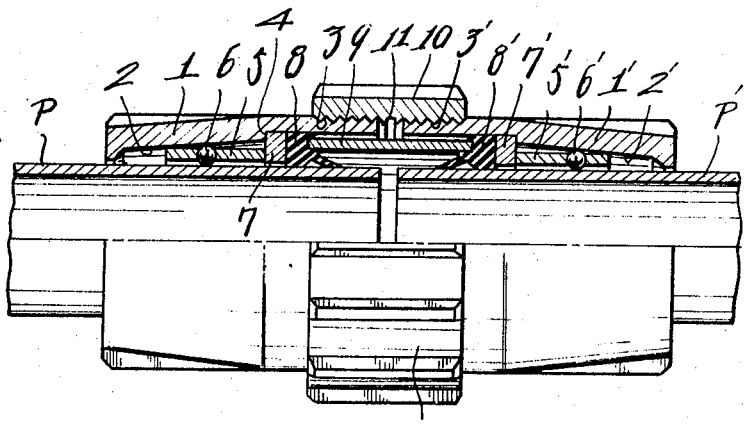
FIG. 1 is a side elevational view, in partial section, of a first or preferred embodiment of a pipe coupling device according to the present invention illustrating the device together with the pipe sections joined together thereby.
Figure 2:
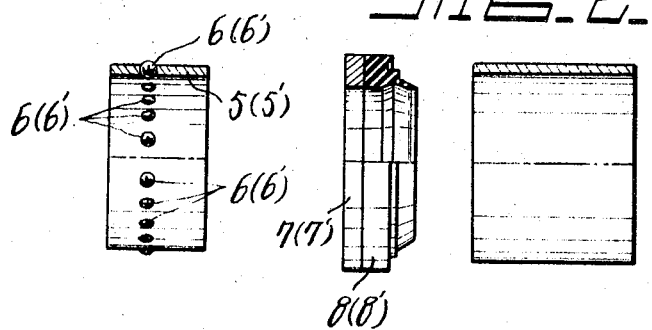
FIG. 2 depicts an exploded fragmentary view in partial section of sealing means employed in the coupling device illustrated in FIG. 1.

With reference to FIGS. 1 and 2 of the drawings, there is shown a first or preferred embodiment of the pipe coupling and/or decoupling device constructed in accordance with the present invention disposed around the adjacent ends of pipe sections P-P' to be joined together thereby. The pipe coupling device includes a pair of hollow cylindrical members 1 and 1' which may be arranged in an axially aligned and spaced end to end relation.

The cylindrical hollow member 1 has its inner peripheral surface provided with a tapered inner surface portion 2 which slopes radially and inwardly, and extends approximately from a midpoint of the aforementioned inner surface to the outer end of the cylindrical hollow member 1. The outer peripheral surface of the the hollow member 1 is provided with a threaded portion 3 near the inner end of the cylindrical hollow member 1.

The internal peripheral surface of the cylindrical hollow member 1 is further provided with an annular recess 4 having a substantially uniform diameter, and extending from the rear end of the tapered surface portion 2 to the inner end of the cylindrical hollow member 1, thereby defining a shoulder in the junction between the tapered surface portion 2 and recess 4. A retainer ring 5, formed of a suitable resilient material and having a plurality of circumferentially spaced spherical bodies, such as balls 6, partially embedded therein, is received within the tapered surface portion 2 of the cylindrical hollow member 1. The balls 6 may have a diameter which is larger than the wall thickness of the retainer ring 5, so that portions of the balls 6 may protrude out of both the outer and the inner surfaces of the retainer ring 5.

An integral stop and packing assembly, including an annular resilient stop ring 7 and an annular resilient packing member 8, is received within the annular recess in the internal peripheral surface of the cylindrical hollow member 1 in abutment against the aforementioned shoulder.

The construction of the mating cylindrical hollow member 1' is substantially similar to that of the cylindrical hollow member 1. The hollow member 1' has a tapered inner surface portion 2' which slopes radially and inwardly, and extends from a midpoint of the internal surface to the outer end of the associated cylindrical hollow member 1'. The outer peripheral surface of the hollow member 1' at the inner end thereof is provided with a threaded portion 3'. The hand or direction of the threads of the threaded portion 3' is opposite to that of the hand or direction of the threads in the corresponding threaded portion 3.

An annular recess 4' is also provided in the internal peripheral surface of the hollow member 1', and the recess 4' has a substantially uniform diameter and extends from the rear end of the tapered surface portion 2' to the inner end of the associated hollow member 1' to define a shoulder in the junction between the tapered surface portion 2' and the recess 4'. A retainer ring 5' formed of the same resilient material as that of the retainer ring 5 and having similar circumferentially spaced balls 6' partially imbedded therein is received within the tapered surface 2' of the associated hollow member 1'. As in the case of the retainer ring 5 for the hollow member 1, the balls 6' in the retainer ring 5' also have a diameter which is larger than the wall thickness of the associated retainer ring 5'. An integral stop and packing assembly, which also includes an annular resilient stop ring 7' and an annular resilient packing member 8', is received within the recess 4' in the internal peripheral surface of the associated hollow member 1' in abutment against the aforementioned shoulder.

An annular pusher member 9 is disposed between the pair of hollow members 1 and 1' with the opposite ends of the pusher member 9 intruding into the material of the opposite resilient packing members 8 and 8'. Tightening or fastening means, such as an annular fastening member 10 having a threaded internal peripheral surface 11, is threaded on the threaded portions 3 and 3' by means of its threaded internal surface 11. The threaded internal peripheral surface of the tightening or fastening member 10 is divided into two half-portions having the opposite hand or direction threads for threaded engagement with the opposite hand or directional threads 3 and 3' in the hollow members 1 and 1'.

Prior to receiving the pipe sections P and P' to be joined by the coupling device, the tightening or fastening member 10 is partially threaded onto the hollow members 1 and 1' sufficiently to hold the component elements within the hollow members 1 and 1' in position. In FIG. 1, the fastening member 10 is shown in its fully tightened position in which the threaded internal surface 11 of the fastening member 10 is in full engagement with the threaded outer surface portions 3 and 3' so as to maintain the pipe sections P and P' in a fully tightened or air-tight relation. However, when the pipe sections P and P' are received to be joined together, the threaded internal peripheral surface 11 is maintained in its partial engagement with the threaded outer surface portions 3 and 3' of the hollow members 1 and 1' so that the pipe sections P and P' may be easily and readily received in the coupling device.

In operation, it is assumed that the pipe sections P and P' have been endwise received in the pipe coupling device with the fastening member 10 maintained in its partially threaded engagement with the threaded surface portions 3 and 3' of the hollow members 1 and 1'. When the fastening member 10 is then turned in the tightening direction, the hollow members 1 and 1' are pulled or urged toward each other because the threaded outer surface portions 3 and 3' on the cylindrical hollow members 1 and 1' and the two half-portions of the inner surface 11 of the fastening member 10 which mate with the threaded portions 3 and 3', respectively, have opposite hands or directions. As the hollow members 1 and 1' are pulled toward each other in the manner which is above described, the inner tapered surface portions 2 and 2' of the cylindrical members 1 and 1' in the turn urge the balls 6 and 6', which are partially embedded in the resilient retainer rings 5 and 5', outwardly along the tapered surface portions in firm abutment against the outer periphery of the pipe sections P and P', respectively. Simultaneously, the annular pusher member 9 urges the material of the resilient stop rings 7 and 7' and the packing members 8 and 8' in unison outwardly, and at the same time forces the material in the packing members 8 and 8' to bulge radially and inwardly against the outer periphery of the pipe sections P and P', respectively, thereby to provide an air-tight seal between the hollow members and the pipe sections.

As the fastening member 10 is turned in the tightening direction, the resilient packing members 8 and 8' and the resilient stop rings 7 and 7' are pushed outwardly in the axial direction of the pipe coupling device as mentioned above. However, since the internal peripheral surface of the hollow members 1 and 1' are provided with the shoulders defined by the tapered surface portions 2 and 2' and the recesses 4 and 4', respectively, the outwardly axial movement of the packing members 8 and 8' and stop rings 7 and 7' is limited by the abutment of the stop rings 7 and 7' against the respectively associated shoulders. Accordingly, the material of the packing members 8 and 8' is prevented from bulging outwardly in the axial direction while the packing material is allowed to bulge radially inwardly even after the stop rings 7 and 7' have abutted against and have been stopped by the respectively associated shoulders. This provides air-tight seals between the inner periphery of the hollow members 1 and 1' and the outer periphery of the pipe sections P and P', respectively.

Figure 3:
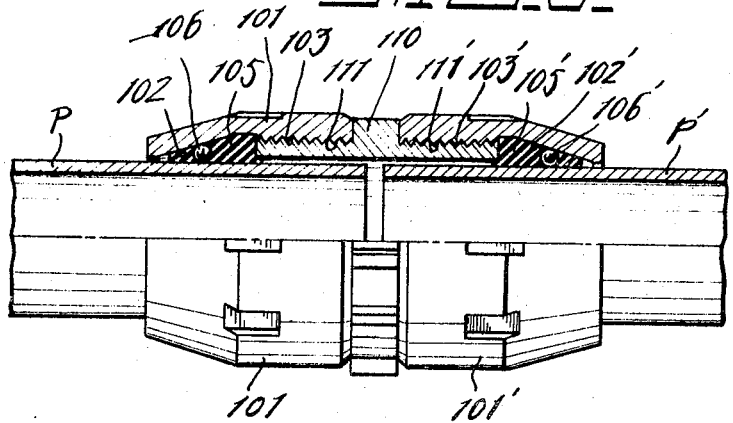
FIG. 3 illustrates a second or modified embodiment of the coupling device according to the present invention.

FIGS. 3, 4 and 5 show a second or modified embodiment of the pipe coupling device according to the present invention. The modified pipe coupling device generally comprises a pair of hollow members 101 and 101' which are disposed in an axially aligned and spaced relation. The member 101 may be cylindrical in shape and have its inner peripheral surface provided with a tapered surface portion 102 which slopes radially and inwardly, and extends from a midpoint of the inner surface of the outer end of the hollow member 101. A uniform diameter threaded portion 103 is provided at the inner end of the cylindrical hollow member 101.

Similarly, the other hollow member 101' may also have a cylindrical shape and have an internal peripheral surface provided with a tapered surface portions 102' which slopes radially and inwardly, and extends from a midpoint of the internal surface to the inner end of the hollow member 101'. A uniform diameter threaded portion 103' extends from the midpoint of the internal surface to the inner end of the hollow member 101'.

The hand or direction of the threads in the threaded portion 103' is opposite to that of the threads in the threaded portion 103. An annular resilient retainer ring 105, formed of a suitable resilient material such as rubber, and having at least 5 balls 106 partially embedded therein, is disposed within the hollow member 101 in abutment with the tapered surface portion 102. The resilient retainer ring 105 has its outer surface which tapers substantially in conformity with the tapered configuration of the internal tapered surface portion 102, and has its internal surface of a substantially uniform diameter. The balls 106 have a diameter which is larger than the wall thickness of the retainer ring, and partially protrudes out of both the outer and internal surfaces of the retainer ring 105.

A similar resilient retainer ring 105+ having a plurality of circumferentially circumferentially spaced balls 106' partially embedded therein is disposed within the associated hollow member 101' in abutment against the internal surface portion 102' of the member 101'. The retainer ring 105' also has its tapered outer surface substantially in conformity with the tapered configuration of the internal surface portion 102' of the hollow member 101', and has its internal surface having a substantially uniform diameter.

A fastening member 110 having a threaded outer surface is threaded onto the hollow members 101 and 101'. This threaded outer surface has one end provided with threads in one direction, and the other end provided with threads in the opposite direction, which ends are separated from each other by a smooth larger diameter center portion by which the fastening member 110 is manually turned in one or the other direction.

Prior to receiving the pipe sections P and P' in the device, the fastening member 110 is partially threaded onto the hollow members 101 and 101' so that the pipe sections may be easily received in the coupling device while maintaining the sealing means in position within the members 101 and 101'. FIG. 3 shows the fastening member 110 in its fully tightened condition and, accordingly, the threaded ends 111 and 111' are in full engagement with the associated threaded portions 103 and 103', respectively.

In operation, it is assumed that the fastening member 110 is partially threaded onto the members 101 and 101', and the pipe sections P and P' are received in the coupling device in an axially aligned and spaced end-to-end relation. When the fastening member 110 is turned in the tightening direction, the hollow members 101 and 101' are pulled or urged toward each other because the hand or direction of the mating threaded portion 103 and the threaded end 111 is opposite to that of the other mating portion 103' and threaded end 111', respectively. As the cylindrical members 101 and 101' are pulled toward each other in the manner mentioned just above, the tapered inner surface portions 102 and 102' of the cylindrical members 101 and 101' urge the balls 106 and 106' partially embedded in the respectively associated retainer rings 105 and 105' outwardly along the tapered surface portions 102 and 102' in abutment against the outer surface of the pipe sections P and P'. Simultaneously, the material of the retainer rings 105 and 105' is compressed by the cylindrical members 101 and 101' and the fastening member 110 and forced to bulge radially and inwardly against the outer surface of the pipes P and P' thereby to provide air-tight seals between the inner periphery of the cylindrical members 101 and 101' and the outer surface of the pipe sections P, P'.

FIGS. 6 and 7 shows a further modified form of pipe coupling device of the present invention. The pipe coupling device of FIGS. 6 and 7 generally comprises a pair of axially aligned cylindrical members 201 and 201' disposed in spaced end-to-end relation. The cylindrical member 201 has the inner surface including a tapered surface portion 102 sloping radially and inwardly and extending from a mid-point of the inner surface to the outer end of the cylindrical member and a substantially uniform diameter smooth surface portion 203 extending from the above-mentioned mid-point to the inner end of the cylindrical member. The cylindrical member 201 is further provided with a flange 225 at the inner end extending radially and outwardly and provided with four threaded through bores 226. A resilient annular retainer ring 205 having a plurality of circumferentially spaced balls 206 partially embedded therein is received in the cylindrical member 201. As in the case of foregoing embodiments, the balls 206 protrude partially out of both the outer end inner surfaces of the retainer ring 205. The retainer ring 205 has the radially and inwardly tapered outer surface in conformity with the tapered configuration of the tapered surface portion 201 and the inner surface having a substantially uniform diameter. The other cylindrical member 201' also has the inner surface including a tapered surface portion 202' sloping radially and inwardly and extending from a mid-point of the inner surface to the outer end of the cylindrical member and a substantially uniform diameter smooth surface portion 203' extending from the above-mentioned mid-point to the outer end of the cylindrical member. The cylindrical member 201' is also provided with a flange 225' at the inner end extending radially and outwardly and having four threaded through bores 226'. A similar resilient retainer ring 205' is also disposed within the cylindrical member 201' and has a plurality of circumferentially spaced balls 206' partially embedded therein. As in the case of the retainer ring 205, the balls 206' partially protrude out of both the outer end inner surfaces of the retainer ring 205. The retainer ring 205' has the radially and inwardly tapered outer surface in conformity with the tapered configuration of the tapered surface portion 201' and the inner surface having a substantially uniform diameter. A fastening member such as a screw bolt 220 is passed through each pair of four pairs of aligned bores 226 and 226' in the opposite flanges 225 and 225' from the bore 225 until the head of the screw bolts abuts against the outer surface of the flange 225. The shank of the screw bolt 222 is threaded at the free end to threadably receive a nut 223. An annular pusher member 224 is disposed within the coupling device bridging the pair of cylindrical members 201 and 201' with the opposite ends abutting against the retainer rings 205 and 205'.

In operation, it is assumed that the nuts 223 are partially threaded on the screw bolts 222 so that pipe sections P and P' may be easily received in the coupling device while maintaining the sealing means in position within the cylindrical members. The pipe sections P and P' are endwise received into the coupling device in an axially aligned and spaced end-to-end relation and the nuts 223 are then tightened. As the nuts 223 are tightened, the cylindrical members are pulled toward each other and the inner tapered surface portions 202 and 202' of the cylindrical members 201 and 201' in turn urge the retainer rings 205 and 205' outwardly along the tapered surface portions in abutment against the outer surface of the pipe sections P and P' and at the same time cause the material of the retainer rings 205 and 205' to bulge axially and inwardly so as to embrace the opposite ends of the pusher ring 224 thereby to provide air-tight seals between the interior of the cylindrical members 201 and 201' and the outer surface of the pipe sections P and P'.

FIG. 8 shows a still further modified form of pipe coupling device of the present invention which is quite similar to the embodiment of FIGS. 6 and 7 in the construction, arrangement and function of the constituting components except for the construction of the cylindrical members and accordingly, the same or similar parts of the embodiment of FIG. 8 bear the same reference numerals as those of the corresponding parts of the embodiment of FIGS. 6 and 7. The pipe coupling device of FIG. 8 generally comprises a pair of axially aligned cylindrical members 301 and 301' disposed in a spaced end-to-end relation. The cylindrical member 301 comprises a plurality of sector portions each having radially and outwardly extending bored flanges 301a at the opposite side edges. In assembling the plural sector portions, a screw bolt 326 is passed through each pair of aligned bores in the adjacent side edge flanges of adjacent sector portions and tightened by nuts (not shown). The other cylindrical member 301' also comprises a plurality of sector portions each having radially and outwardly extending flanges 301'a at the opposite sides edges and assembled together by screw bolts 326' and nuts (not shown) in the same manner as cylindrical member 301.

In joining pipe sections by the use of any of the above-mentioned pipe coupling devices of the present invention, pipe sections to be joined are endwise inserted into the hollow cylindrical members at the outer ends of the cylindrical members to a desired position therein and thereafter, the cylindrical members are tightened by the fastening members so as to pull the cylindrical members toward each other until the pipe sections will be firmly gripped by the cylindrical members. As the cylindrical members are pulled toward each other in the manner mentioned above, the resilient sealing means are urged against the inner surface of the cylindrical members and the outer surface of the pipe sections with increasing pressure to provide air-tight seals between the inner surface of the cylindrical members and the outer surface of the pipe sections and at the same time the balls are urged outwardly in the axial direction in abutment against the tapered inner surface portions of the cylindrical members and the outer surface of the pipe sections with increasing pressure to act as wedge means. Thus, it will be understood that the greater the movement of the pipe sections is the greater the wedging action by the balls is. As the wedge-acting balls are urged outwardly in the axial direction by the tapered inner surface portions of the cylindrical members, the force applied upon the balls first acts in the direction at right angles with respect to the plane of the tapered inner surface portions and then on the pipe sections at right angles with respect to the plane of the outer surface of the pipe sections thereby to provide a force preventing the pipe sections from separating from the cylindrical hollow members. A substantial portion of the resisting force is applied on the pipe sections resulting in decrease in the force acting on the junction between the cylindrical hollow members and pipe sections. This is very advantageous in selecting material in the manufacture of the coupling device and the force relation on the wall thickness of the cylindrical members. Furthermore, the force acting on the pipe sections can be always evenly distributed along the length of the pipe sections in all directions because of the presence of the balls between the cylindrical members and the pipe sections resulting in substantial decrease of the possibility of damage on the pipe sections.

And air-tight sealing between the cylindrical members and pipe sections can be perfectly effected by means of the resilient retainers, stop rings and/or packing members as mentioned above.

In the pipe coupling device of the present invention, when the device is not in its fully tightened condition, the inner diameters of the cylindrical members, retainer rings, annular packing members, annular pusher member and annular stop members are, respectively, larger than the dimension comprising the outer diameter of the pipe sections plus the tolerances allowed from the component parts of the coupling device, respectively, and therefore, pipe sections can be easily received into the device and jointed therein without any difficulty. Even when pipes to be jointed have the outer diameter smaller than the dimension comprising their nominal outer diameter minus tolerance, since the cylindrical members have the tapered inner surface portions and the annular pusher member affords a suitable and sufficient degree of tightening, air-tight seals can be easily and effectively provided between the cylindrical members and the pipe sections and between the pipe sections themselves. In this way, a substantial range of deviations from tolerance can be perfectly absorbed.

As mentioned above, according to the present invention, since the balls which act as wedge means are present in the spaces between the tapered inner surface portions of the cylindrical members and pipe sections to be jointed thereby, even when the thus jointed pipe sections sink disproportionally or are displaced due to inner pressure, the balls are caused to abut firmly against the tapered inner surface portions of the cylindrical members and the outer surface of the pipe sections because of the non-rotation property of the balls and the specific relative relation between the tapered inner surface portions of the cylindrical members and the movement of pipe sections. Thus, the larger the movement of pipe sections is, the more effective the wedging action of the balls is. By the provision of the balls and resilient sealing means, pipe sections jointed by the coupling device can be effectively prevented from coming off the device and fluid flowing through the pipe sections can be effectively prevented from leaking out by air-tight seals provided by the sealing means.

The novel pipe coupling devices can join pipe sections which have not been previously subjected to mechanical processing such as welding and/or threading which are necessary in jointing the pipe sections by the conventional pipe coupling devices and can accommodate pipe sections having different diameters in a simpler manner.

When a number of the novel pipe coupling device are employed in a piping system involving a number of jointed pipe sections with each coupling device positioned in the juncture between adjacent pipe sections, each coupling device accommodates expansion and/or shrinkage in each individual pipe section thereby to eliminate the possibility of concentration of the tension on the entire pipe system at any particular point along the pipe system and the necessity for the use of any conventional expansion joint. And even when one or more pipe sections in the piping system sink disproportionally, the coupling device can accommodate any tension and/or strain caused by such disproportional sinking of pipe section or sections and the specific action of the balls eliminates any possible damage which may be otherwise inflicted to the pipe sections. In addition, it has been found that the novel pipe coupling devices can stand against any substantial amount of inner pressure load, external pressure load and tension. When the novel pipe coupling device is designed to be employed for jointing pipe sections having the diameter of 25 mm, the device can stand against the pressure up to 330 kg/cm$^2$. Thus, the present invention will make a great deal of contribution to the art.

I claim:

1. A device for selectively coupling and/or decoupling a plurality of pipe sections, comprising, in combination:

a plurality of hollow members each having a tapered inner surface portion and adapted to receive at least one of said pipe sections;

a plurality of spherical bodies disposed between said tapered inner surface portion of a hollow member and a portion of the outer surface of an associated pipe section for acting as wedge means to prevent separation of said hollow member from said associated pipe sections;

sealing means disposed between a hollow member and its associated pipe section for selectively providing an air-tight seal therebetween when said sealing means is compressed;

fastening means disposed between said hollow members for moving said hollow members toward each other and for urging said sealing means against the inner surface of said hollow members and the outer surface of said pipe sections;

said hollow members comprise cylindrical members which are disposed in axial alignment in a spaced relation;

said spherical bodies are disposed in abutment against said tapered inner surface portions and said pipe sections for acting as wedge means to prevent said pipe sections from coming off of said cylindrical members;

said sealing means includes resilient elements disposed between said cylindrical members and said pipe sections for providing air-tight seals between said cylindrical members and said pipe sections;

said fastening means is disposed between said cylindrical members for pulling said cylindrical members toward each other so as to urge said sealing means against the inner surface of said cylindrical members and the outer surface of said pipe sections; and wherein said air-tight sealing means comprises resilient retainer rings each having a plurality of said spherical bodies partially embedded therein, resilient stop rings in abutment against said retainer rings, and resilient packing members in abutment against said stop rings on the side opposite to said retainer rings.

2. A device characterized in accordance with claim 1, wherein said cylindrical members have annular recesses in their inner surface adjacent to said tapered inner surface portions for partially receiving said resilient stop rings and packing members therein; oppositely directed threaded portions are provided in the outer periphery of said cylindrical members; and said fastening means comprises a pusher member having its opposite ends abutting against said resilient packing members, and an annular fastening member having its inner surface provided with oppositely directed threaded portions for engagement with said oppositely directed threaded portions in the outer periphery of said cylindrical members.

3. A device for selectively coupling and/or decoupling a plurality of pipe sections, comprising, in combination:
- a plurality of hollow members each having a tapered inner surface portion and adapted to receive at least one of said pipe sections;
- a plurality of spherical bodies disposed between said tapered inner surface portion of a hollow member and a portion of the outer surface of an associated pipe section for acting as wedge means to prevent separation of said hollow member from said associated pipe sections;
- sealing means disposed between a hollow member and its associated pipe section for selectively providing an air-tight seal therebetween when said sealing means is compressed;
- fastening means disposed between said hollow members for moving said hollow members toward each other and for urging said sealing means against the inner surface of said hollow members and the outer surface of said pipe sections;
- said hollow members comprise cylindrical members which are disposed in axial alignment in a spaced relation;
- said spherical bodies are disposed in abutment against said tapered inner surface portions and said pipe sections for acting as wedge means to prevent said pipe sections from coming off of said cylindrical members;
- said sealing means includes resilient elements disposed between said cylindrical members and said pipe sections for providing air-tight seals between said cylindrical members and said pipe sections;
- said fastening means is disposed between said cylindrical members for pulling said cylindrical members toward each other so as to urge said sealing means against the inner surface of said cylindrical members and the outer surface of said pipe sections; and
- wherein each of said cylindrical members includes a plurality of sector portions joined together by means of flanges and screw bolts.

4. A device for selectively coupling and/or decoupling a plurality of pipe sections, comprising, in combination:
- a plurality of hollow members each having a tapered inner surface portion and adapted to receive at least one of said pipe sections;
- a plurality of spherical bodies disposed between said tapered inner surface portion of a hollow member and a portion of the outer surface of an associated pipe section for acting as wedge means to prevent separation of said hollow member from said associated pipe sections;
- sealing means disposed between a hollow member and its associated pipe section for selectively providing an air-tight seal therebetween when said sealing means is compressed;
- fastening means disposed between said hollow members for moving said hollow members toward each other and for urging said sealing means against the inner surface of said hollow members and the outer surface of said pipe sections;
- wherein said hollow members comprise cylindrical members which are disposed in axial alignment in a spaced relation;
- said spherical bodies are disposed in abutment against said tapered inner surface portions and said pipe sections for acting as wedge means to prevent said pipe sections from coming off of said cylindrical members;
- said sealing means includes resilient elements disposed between said cylindrical members and said pipe sections for providing air-tight seals between said cylindrical members and said pipe sections;
- said fastening means is disposed between said cylindrical members for pulling said cylindrical members toward each other so as to urge said sealing means against the inner surface of said cylindrical members and the outer surface of said pipe sections;
- said air-tight sealing means includes resilient retainer members each having a plurality of said spherical bodies partially embedded therein;
- said fastening means includes flanges provided at the inner ends of said cylindrical members extending radially and outwardly therefrom and having threaded bores therein;
- screw bolts threaded in said threaded bores of said flanges;
- an annular pusher member having its opposite ends abutting against said resilient retainer members; and
- wherein each of said cylindrical members includes a plurality of sector portions joined together by means of flanges and screw bolts.

* * * * *